(No Model.) 3 Sheets—Sheet 1.
J. BENNOR.
Mercury Seal for Stench Traps.
No. 237,362. Patented Feb. 8, 1881.
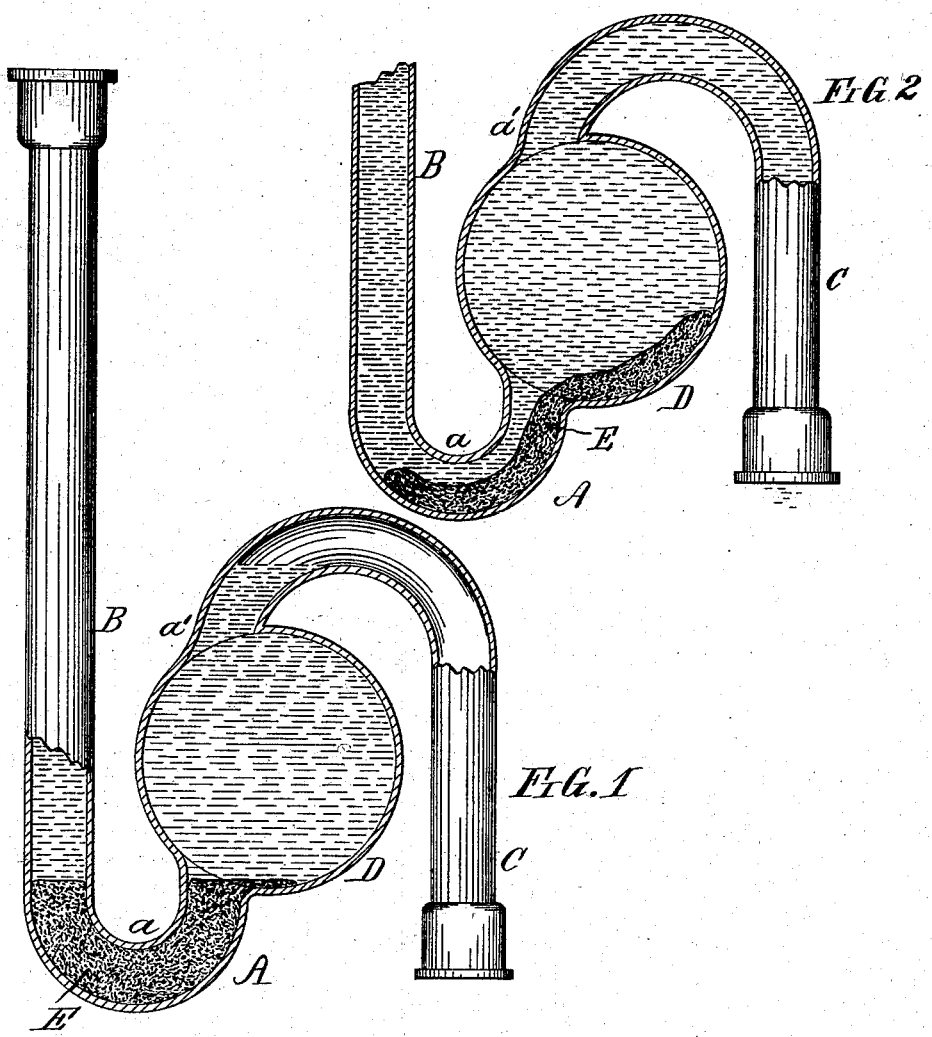

(No Model.) 3 Sheets—Sheet 2.
J. BENNOR.
Mercury Seal for Stench Traps.
No. 237,362. Patented Feb. 8, 1881.
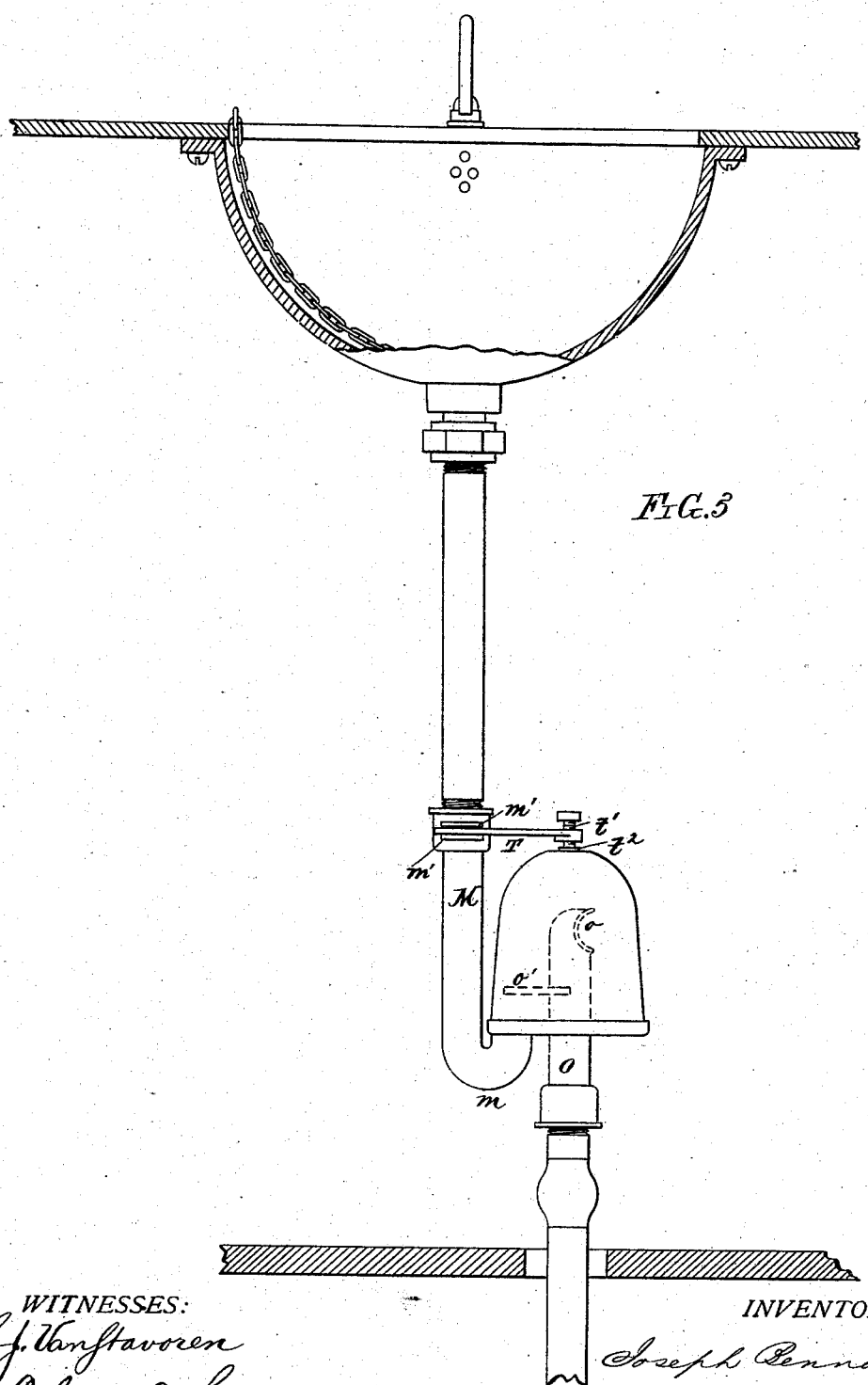
WITNESSES:
INVENTOR (No Model.) 3 Sheets—Sheet 3.

J. BENNOR.
Mercury Seal for Stench Traps.

No. 237,362. Patented Feb. 8, 1881.

WITNESSES:
S. J. Vanstavoren
T. J. McTighe

INVENTOR,
Joseph Bennor,
By Connolly Bros,
ATTORNEYS

N. PETERS, PHOTO-LITHOGRAPHER, WASHINGTON, D. C.

UNITED STATES PATENT OFFICE.

JOSEPH BENNOR, OF PHILADELPHIA, PENNSYLVANIA.

MERCURY-SEAL FOR STENCH-TRAPS.

SPECIFICATION forming part of Letters Patent No. 237,362, dated February 8, 1881.

Application filed June 18, 1880. (No model.)

*To all whom it may concern:*

Be it known that I, JOSEPH BENNOR, of the city and county of Philadelphia, in the State of Pennsylvania, have invented Improvements in Mercury-Seals for Stench-Traps, of which the following is a description, reference being had to the accompanying drawings, forming part of this specification, wherein—

Figure 4:
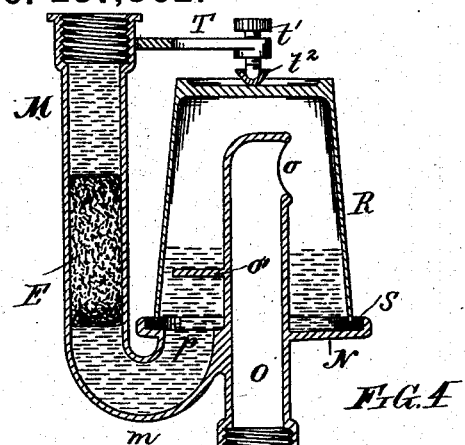
Figure 5:
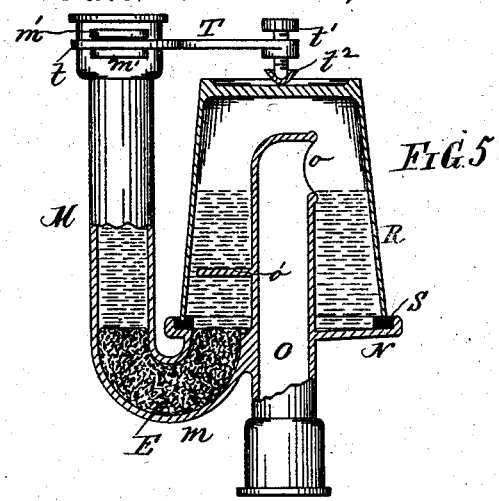
Figure 6:
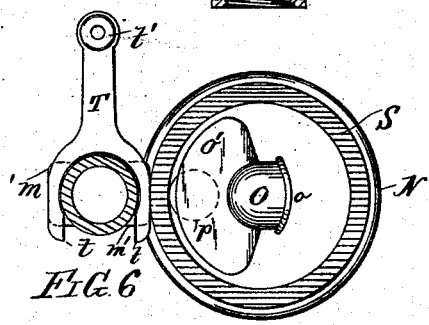
Figure 7:
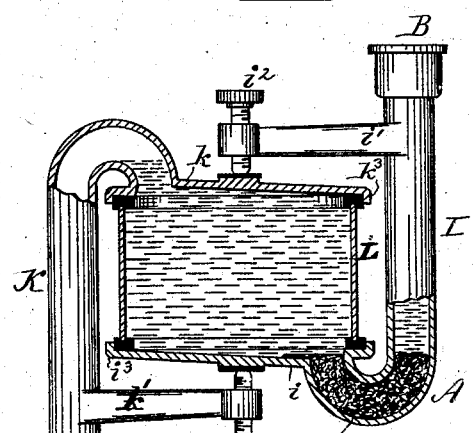
Figure 8:
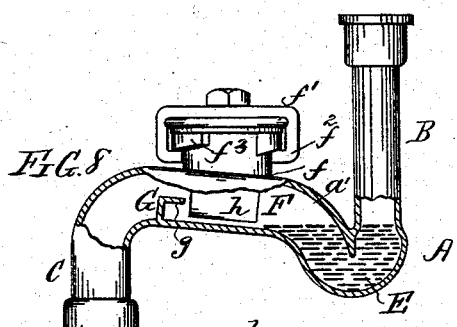
Figure 9:
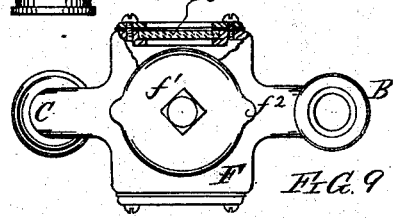
Figure 10:
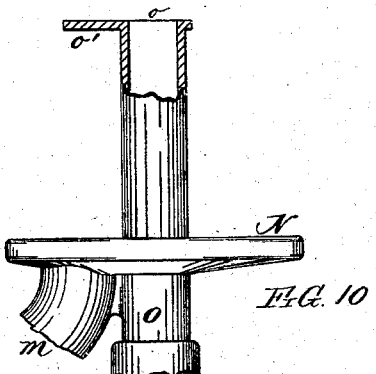

Figures 1 and 2 represent vertical sections, partly in elevation, of the simplest form of my invention, showing the positions of the mercury when the trap is sealed and when unsealed. Fig. 3 represents an elevation of the preferable form of my invention attached to the outlet-pipe of a wash-basin, the latter being in section. Figs. 4 and 5 are vertical sections of the same, showing the different positions of the mercury under varying pressure. Fig. 6 is a plan of Fig. 4, with the cap removed and the swiveled arm turned to one side. Figs. 7 and 8 are elevations, partly in section, of modifications of my invention. Fig. 9 is a plan of Fig. 8, partly in section, and Fig. 10 is a detail modification.

My invention has for its object to provide a mercury-seal joint for the traps of wash-stands, sinks, bath-tubs, urinals, and other fixtures from which waste water or other fluid is conveyed by a discharge-pipe to a sewer or other conduit or receptacle, said seal being so constructed that it will open readily under direct downward pressure from above, but will close on back or upward pressure.

My improvements consist, essentially, in the peculiar construction of a trap adapted to hold mercury in such manner that the latter will normally form a seal-joint, will open readily without loss or waste of mercury under fluid-pressure exerted from above to permit the discharge of such fluid, will close automatically when such pressure is relieved by the discharge of said fluid, and will elongate itself in a solid vertical column against back-pressure from sewer or other gases, to prevent the passage of such gases through the trap or their admission to the discharge-pipe above the latter.

My invention further consists in certain details of construction and combination hereinafter fully specified.

Referring to the accompanying drawings, Figs. 1 and 2 show the principle and the simplest form of construction of a trap embodying my invention. A in said figure shows an S-trap, having an induction-pipe, B, and eduction-pipe C. In said trap, above its lower bend, $a$, and on the side adjacent to the eduction-pipe C, is a bulb or enlarged chamber, D. E represents mercury in the trap in sufficient quantity to seal the same. When water in sufficient quantity to overbalance the mercury is admitted to the induction-pipe B the mercury will be forced in sufficient quantity into chamber D to open the joint and permit such water to pass through the trap and down the eduction-pipe, such mercury spreading over the bottom of said chamber, and by reason of the enlarged area of said chamber relatively to the neck of the trap leaving ample space above it for the passage of the water. When the water has been discharged sufficiently to restore equilibrium the mercury will return from the chamber D to the bend $a$ of the trap, having then a body of water above it in the induction-pipe B and another body in the arm $a'$ of the trap, whereby evaporation of such mercury is avoided.

Figs. 8 and 9 show a modification wherein the chamber correspondent to D (and lettered F) has an opening, $f$, with cap $f'$ fastened thereon by lugs, and inclines $f^2$ $f^3$ to permit access to said chamber for cleaning purposes. A wall or dam, G, with overhanging shoulder $g$, is formed on the bottom of said chamber, adjacent to the eduction-pipe, to prevent the mercury from being driven therefrom by a sudden or violent pressure of water. Said chamber may also have a window or windows, $h$ $h$, to permit inspection of the interior.

Fig. 7 shows another modification, in which the trap is formed of two exactly similar sections, I K, and an intervening or connecting cylinder, L, the sections I K being designed to be of cast metal and the cylinder of glass. Each of said sections is formed with a broad platform or shelf, $i$ $k$, respectively, between which the cylinder L (which forms the mercury-spreading chamber) is located. Said sections have each rigid projecting arms $i'$ $k'$, respectively, through which pass binding-screws $i^2$ $k^2$, which bear upon the platforms $i$ $k$, respectively, and hold the latter and cylinder L in position. The platforms should have flanges $i^3$ $k^3$ to surround the edges of cylinder L, and should be dished or concave to permit the free flow of the mercury back into the neck of the trap.

Figs. 3, 4, 5, and 6 show the trap completed in the form which I prefer for practical purposes. M is the induction-pipe, and $m$ the bend of the trap, where the mercury normally rests and forms the seal. N is a flanged platform, through which rises the eduction-pipe O, having its outflow-opening on one side, (shown at $o$.) On the opposite side of said pipe, and projecting over the opening $p$, is a ledge, $o'$, which prevents the mercury from being thrown up to such a height as would permit its passage out the opening $o$. R represents a glass cap, open at its lower end and closed on top. In practice an ordinary jelly-glass inverted answers the purpose admirably. This cap is placed on the platform N, an india-rubber gasket, S, being interposed to make a tight joint and prevent fracture of the glass. T represents an arm, bifurcated at $t$ $t$ to embrace the pipe M between the lugs $m'$ $m'$ and form a swivel. At the opposite end of said arm is a binding-screw, $t'$, with soft pad $t^2$, whereby the cap R is clamped down on the platform N. This permits removal of the cap at any time for cleaning purposes.

The operation is substantially the same in the latter construction—i. e., that shown in Figs. 3 to 6—as in the other modifications previously described. A column of water of sufficient height in the induction-pipe will overbalance the mercury in the trap and drive it, or a portion of it, into the enlarged chamber, (which in Fig. 4 consists of the platform N and cap R,) leaving free space for the passage of the water, which then flows out the eduction-pipe until sufficient has been discharged to permit the mercury to resume its position in the trap, as it will do automatically. In such position the mercury has a column of water on both sides—viz., in the induction-pipe and in the spreading-chamber. Hence no evaporation of mercury can take place, as such evaporation will not proceed under water. Nor can any siphoning of the mercury take place, inasmuch as before this could occur all the water in the cap and induction-pipe must first be drawn off, and as the mercury would not fill the cap or spreading-chamber, being sufficient in quantity to form only a thin sheet on the bottom of said chamber, air rushing down the induction-tube would destroy the vacuum in said chamber and prevent the mercury from being siphoned.

What I claim as my invention is—

1. A mercury-seal joint or stench-trap having an induction and an eduction pipe and an enlarged intervening chamber, substantially as described, whereby the mercury which forms the seal will, under superposed fluid-pressure in the induction-pipe, be lifted into and dispersed over the bottom of said chamber, permitting the discharge of such fluid, such mercury automatically sealing the trap after said discharge and rising in a solid column in the induction-pipe under back-pressure, as set forth.

2. In combination with the induction-pipe M, having a bend or neck, $m$, a platform, N, which forms the bottom of a mercury-spreading chamber, substantially as shown and described.

3. In combination with induction and eduction pipes M O and a platform, N, a removable cap or section, forming with said platform a mercury-spreading chamber, and means, substantially as described, for clamping or securing the same in position.

4. In combination with induction and eduction pipes and an intermediate mercury-chamber, a ledge, $o'$, or projection for preventing mercury from being forced into eduction-pipe by violence of flow or pressure in the induction-pipe, as specified.

In testimony that I claim the foregoing I have hereunto set my hand this 16th day of June, 1880.

JOSEPH BENNOR.

Witnesses:
S. J. VAN STAVOREN,
CHAS. F. VAN HORN.